(12) United States Patent
Mitchell

(10) Patent No.: US 8,186,113 B2
(45) Date of Patent: May 29, 2012

(54) BUILDING WINDOW HAVING A VISIBLE-LIGHT-REFLECTIVE OPTICAL INTERFERENCE COATING THEREON

(75) Inventor: Daniel B. Mitchell, Port McNicoll (CA)

(73) Assignee: Raytheon Canada Limited, Ottawa, Ontario (CA)

(*) Notice: Subject to any disclaimer, the term of this patent is extended or adjusted under 35 U.S.C. 154(b) by 663 days.

(21) Appl. No.: 11/825,704

(22) Filed: Jul. 9, 2007

(65) Prior Publication Data
US 2009/0015924 A1    Jan. 15, 2009

(51) Int. Cl.
E06B 3/00 (2006.01)
F21V 9/04 (2006.01)
F21V 9/06 (2006.01)
G02B 5/08 (2006.01)
G02B 5/20 (2006.01)

(52) U.S. Cl. ........................ 52/204.5; 359/359
(58) Field of Classification Search .............. 359/580, 359/589, 590, 359; 52/204.5, 204.6, 786.1, 52/786.11, 786.13, 787.11
See application file for complete search history.

(56) References Cited

U.S. PATENT DOCUMENTS

| | | | |
|---|---|---|---|
| 4,756,602 A | 7/1988 | Southwell et al. | |
| 4,973,511 A | 11/1990 | Farmer et al. | |
| 5,085,926 A | 2/1992 | Iida et al. | |
| 5,780,149 A | 7/1998 | McCurdy et al. | |
| 5,783,049 A | 7/1998 | Bright et al. | |
| 5,894,047 A | 4/1999 | Tanaka | |
| 6,014,845 A | 1/2000 | Jain et al. | |
| 6,057,961 A | 5/2000 | Allen et al. | |
| 6,094,306 A | 7/2000 | Jain | |
| 6,172,812 B1 | 1/2001 | Haaland et al. | |
| 6,209,269 B1 * | 4/2001 | Valderrama | 52/171.3 |
| 6,391,400 B1 * | 5/2002 | Russell et al. | 428/34 |
| 6,420,002 B1 | 7/2002 | Aggas et al. | |
| 6,472,072 B1 | 10/2002 | Ebisawa et al. | |
| 6,531,230 B1 * | 3/2003 | Weber et al. | 428/480 |
| 6,589,613 B1 | 7/2003 | Kunert | |
| 6,632,491 B1 | 10/2003 | Thomsen et al. | |
| 6,720,081 B2 * | 4/2004 | Vitt et al. | 428/432 |
| 2001/0031365 A1 | 10/2001 | Anderson et al. | |
| 2003/0113550 A1 | 6/2003 | Millett et al. | |
| 2004/0156984 A1 | 8/2004 | Vitt et al. | |
| 2005/0078375 A1 | 4/2005 | Hall et al. | |
| 2005/0214544 A1 | 9/2005 | Kujirai | |
| 2006/0083873 A1 | 4/2006 | Asana et al. | |
| 2006/0154049 A1 | 7/2006 | Padiyath et al. | |
| 2006/0182980 A1 | 8/2006 | Barton et al. | |

* cited by examiner

Primary Examiner — Alessandro Amari
(74) Attorney, Agent, or Firm — Lando & Anastasi, LLP

(57) ABSTRACT

A building structure includes a building transparent window glazing, and an optical interference coating overlying and contacting a first surface of the building transparent window glazing. A spectrally averaged transmission of visible light through the building transparent window glazing with the optical interference coating thereon is smaller at a higher angle of incidence than at a lower angle of incidence.

29 Claims, 4 Drawing Sheets

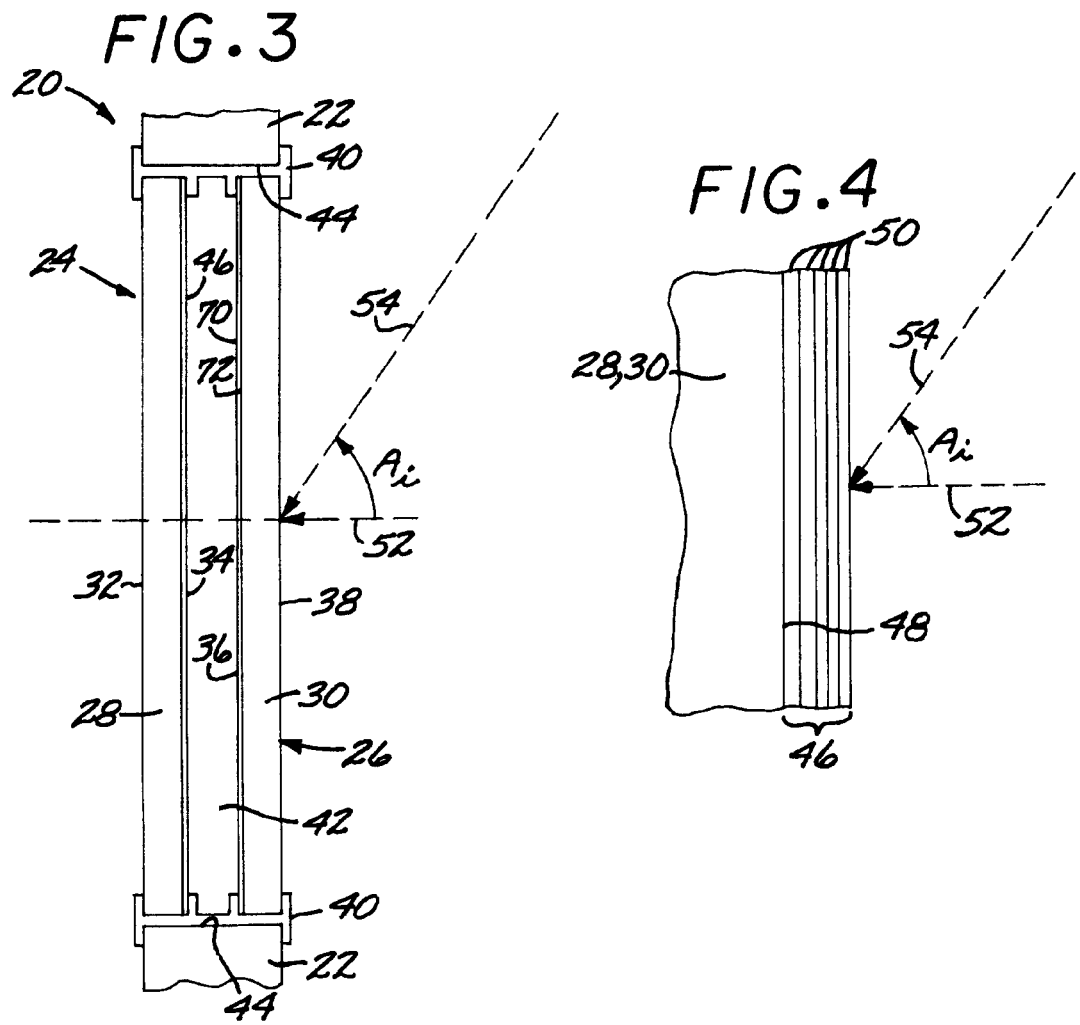
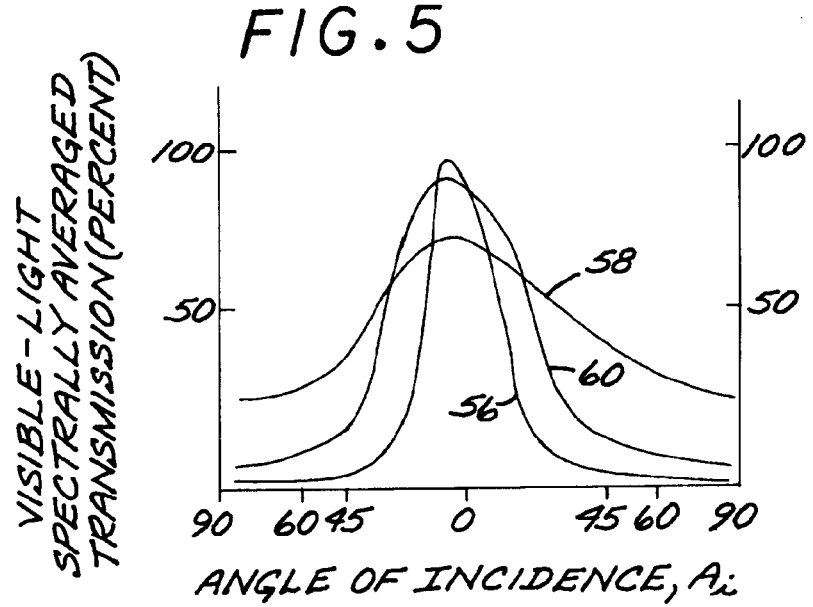

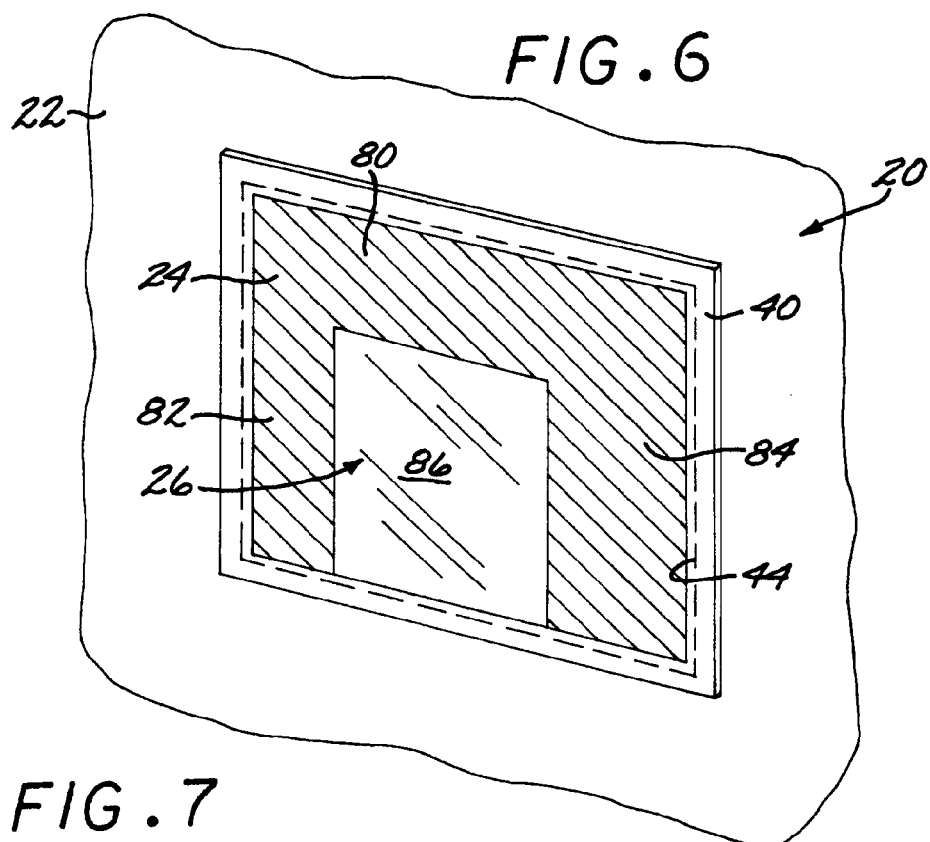
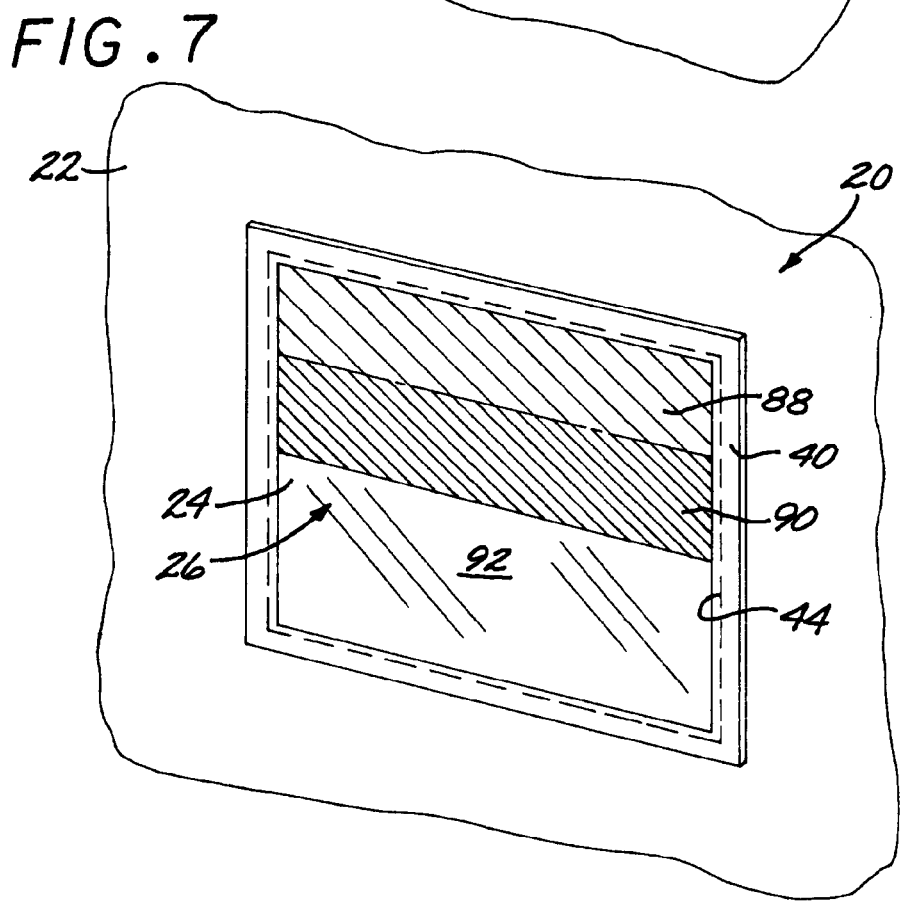

BUILDING WINDOW HAVING A VISIBLE-LIGHT-REFLECTIVE OPTICAL INTERFERENCE COATING THEREON

This invention relates to a building window, and more particularly to a building window having a multilayer interference coating thereon that reduces transmittance of visible light at high angles of incidence.

BACKGROUND OF THE INVENTION

Windows form a large portion of the exterior surface area of many buildings. When light enters the building through the windows, the interior is heated by the light energy. In summer, such interior heating of the building increases the air conditioning demand, and thence the consumption of electrical power.

A number of techniques have been proposed to control the heating of the interior of the building by the light entering the windows. One commonly used approach is exterior window shades and awnings that block all wavelengths of the sunlight incident at higher angles, but allow a person in the building to look out through the window at normal and near-normal incidence angles (measured in the vertical plane) to the window. These shades and awnings are highly effective in controlling interior heat loading, but reduce the visibility through the windows.

Exterior window shades and awnings can be used on residences and other smaller buildings, but they cannot be used effectively in high-rise buildings. Other heat-control techniques have been devised for such buildings. Because the human eye sees only in the visible spectrum, "low E" window coatings have been designed to block the infrared portion of sunlight, allowing the visible portion of the sunlight to enter the window largely unimpeded. Indium-tin-oxide (ITO) coatings are an example of such infrared-blocking coatings. Tints have also been employed on the window glass to reduce the transmission of light energy.

These techniques have been only partially effective for high-rise and other buildings for which exterior window shades and awnings cannot be used. There is a need for a better approach to controlling the introduction of heat by transmitted sunlight into the interiors of buildings. The present invention fulfills this need, and further provides related advantages.

SUMMARY OF THE INVENTION

The present approach provides a technique by which a coating on a building window provides many of the benefits of an external shade or awning. The coating reflects visible light that is incident upon the window at a high angle of incidence, but transmits visible light that is incident upon the window at a low angle of incidence (i.e., nearly perpendicular to the plane of the window). The heat energy introduced into the interior of the building by the high-angle visible light is thereby significantly reduced, yet an occupant of the building can look out the window to view the scene that is in the normal field of interest.

In accordance with the invention, a building structure comprises a building transparent window glazing, and an optical interference coating overlying (and optionally but preferably contacting) a first surface of the building transparent window glazing. The optical interference coating preferably is a multilayer dielectric inorganic optical interference coating. A spectrally averaged transmission of visible light through the building transparent window glazing with the optical interference coating thereon is smaller at a higher angle of incidence than at a lower angle of incidence. (Spectral averaging is over visible light of wavelengths 425 to 675 nanometers.) In a typical case, the spectrally averaged transmission of visible light through the building transparent window glazing with the optical interference coating thereon is smaller at an angle of incidence of 60 degrees than at an angle of incidence of 0 degrees. (As used herein, the "angle of incidence" is measured from a line perpendicular to the first surface. A 0-degree angle of incidence is perpendicular to the surface of the window.)

The building transparent window glazing is made of any operable material that is transparent to visible light, and typically is made of silica glass. The present approach is desirably used on full-size building windows, such as those wherein the first surface of the building transparent window glazing has a surface area of at least 4 square feet, and more preferably at least 10 square feet.

There may be provided a building window frame in which the building transparent window glazing is received. The building structure typically further includes a wall of a building, and an opening through the wall of the building in which the building transparent window glazing, mounted in the window frame, is received. The present approach may be used on windows on any side of the building, but it is most advantageously used where the wall of the building is a south-facing wall in the northern hemisphere or a north-facing wall in the southern hemisphere.

The window may have two or more panes of glass. For example, the building transparent window glazing may comprise two panes of glass set into a building window frame with a dead space between the panes of glass. The dead space may be filled with air or an inert gas, or may be evacuated. The dead space between the two panes of glass reduces heat transfer through the window by conduction and convection mechanisms, thereby providing insulation. The first surface is on one of the two panes of glass, most preferably on one of the surfaces facing the dead space.

One of the desirable features of the present approach is that it may be used in conjunction with an infrared-reduction coating overlying (and optionally but preferably contacting) a second surface (which may be the same as the first surface, but is preferably a different surface) of the building transparent window glazing. In the case of the two-pane glazing, the optical interference coating and the infrared-reduction coating may be on the two surfaces facing the dead space. This arrangement prevents the coatings from being damaged from sources exterior to the building or interior to the building.

The basis of the present approach is the recognition that the visible-light portion of the solar spectrum carries nearly as much heat energy as does the infrared-light portion of the solar spectrum. Prior approaches that have emphasized only the reduction of infrared energy that would otherwise pass through the window into the building, such as those using ITO coatings on the window, have had little or no effect on the heat energy transmitted with the visible light. Prior approaches that have reduced the visible light, such as tints on the window, have reduced the visibility through the window of the occupants of the building in the direction normally viewed, which is roughly in the plane of the horizon and a few degrees above and below the horizontal plane.

In the present approach, on the other hand, the multilayer dielectric inorganic optical interference coating reflects the visible light and the heat energy carried in the visible-light spectrum. The degree of reflection is dependent upon the angle of incidence of the visible light upon the window and the interference coating. Light incident at low angles is affected very little. This low angle of incidence corresponds with the normal viewing region near the horizontal plane. Visible light incident upon the window at increasingly great angles of incidence is increasingly attenuated, although that increase in attenuation need not be regular or monotonic. The angle of incidence of direct sunlight is high during the hottest parts of the day, particularly in the summer when the concern with heat loading of the building interior is greatest. Consequently, the visible portion of the incident sunlight at such higher angles of incidence is reflected, and its heat energy does not reach the interior of the building.

The present approach that attenuates visible light at higher angles of incidence may be combined with other non-directional techniques that reduce the penetration of infrared wavelengths through the window into the building, thereby addressing the wavelength ranges that carry about 95 percent of the heat energy in solar radiation. For example, the window may be tinted, although tinting reduces visibility over all angles, including 0-degree and near-0-degree angles of incidence.

An occupant of the building that uses the present approach on its windows will not notice much change in the light intensities in the usual visual field at, just above, and just below the horizontal plane without looking far to the side. However, if the occupant looks out of the window and upwardly from the horizontal plane, downwardly from the horizontal plane, or sideways at a higher angle, there is a significant reduction in the intensity of the visible image of the sky and other features whose image reaches the window at high angles of incidence. Depending upon the specific design of the multilayer dielectric inorganic optical interference coating, there is typically a reduction in the intensity of the visible incident light to less than 35 percent of the usual intensity of the image, and in some cases to less than 25 percent of the usual intensity of the image. The occupant is therefore able to see the features at these higher angles of incidence, thought somewhat darkly as though twilight had reached the higher-angle features.

One advantage of the present approach is that it is highly flexible. The windows of a building may be given different treatments according to the nature of the scene viewed through the window and other considerations. For example, a window having little by way of a scenic view for the occupant can be given a highly effective coating and insulating treatment over its entire surface. In a case where the view is highly desirable in a particular direction, the attenuation afforded by the optical interference coating may be tailored to provide little loss of visibility in the direction of the desirable view. The optical interference coating may be intentionally spatially varied to be non-uniform over the surface of the widow. One such technique is to coat only a portion of the window with the optical interference coating, so that there is no loss of view at all through the uncoated portion (although there will be a higher heat transmission through this uncoated portion), while other portions of the window are provided with the optical interference coating. (Spatial variation of the optical interference coating includes, but is not limited to, an absence of the optical interference coating in some areas and its presence in other areas.) For example, the window could be coated on its upper portion and/or lower portion, but left uncoated in a band from 4-7 feet from floor level. The present approach may also be used to grade or graduate the transmission of the optical interference coating, so that different areas have different attenuations for the same higher angle of incidence.

The multilayer dielectric inorganic optical interference coating thus functions to some degree in the manner of an exterior window shade or awning by reducing the intensity of the visible sunlight at higher angles of incidence. The present approach differs in visual effect from the exterior window shade or awning in that features at the higher angles of incidence may be seen more darkly than those at lower angles of incidence, and also in that the present approach has no window shade or awning projecting from the side of the building.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is an enlarged schematic sectional view of the building transparent window glazing of FIG. 2, taken on line 3-3;

FIG. 4 is a detail of FIG. 3, illustrating the optical interference coating;

FIG. 5 is an idealized graph of examples of a curve of transmission as a function of angle of incidence of sunlight upon the transparent window glazing;

FIG. 6 is a perspective detail like that of FIG. 2, wherein a portion of the building transparent window glazing is coated with the optical interference coating;

FIG. 7 is a perspective detail like that of FIG. 2, wherein the transmission of the optical interference coating on the building transparent window glazing is graduated;

DETAILED DESCRIPTION OF THE INVENTION

Figure 1:
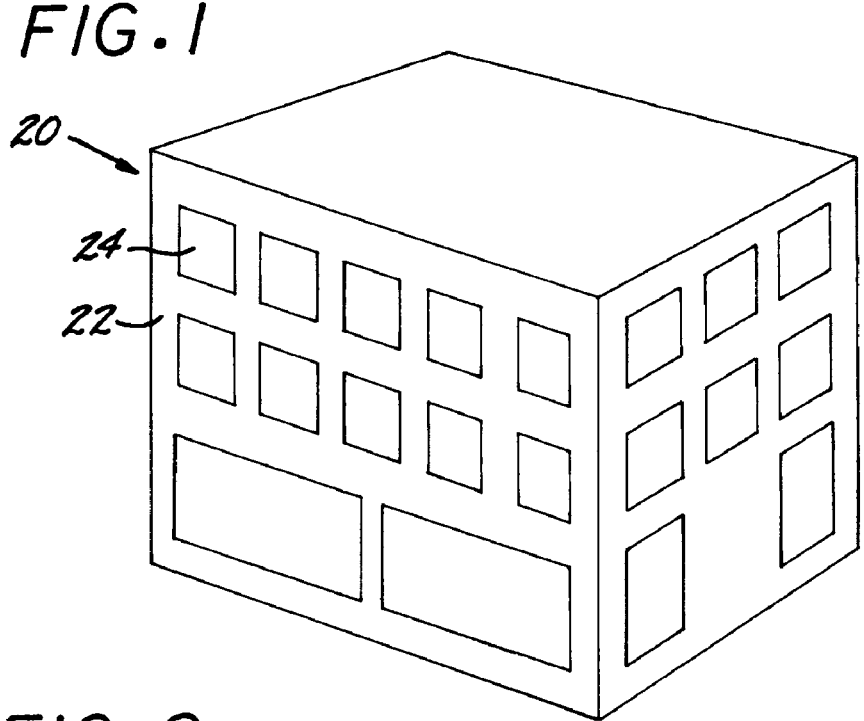
FIG. 1 is a perspective view of a building structure using the present approach.

FIG. 1 depicts a building structure 20. The building structure 20 includes a building external wall 22 in which a plurality of windows 24 are set so that the occupants of the building structure 20 may see out and sunlight may enter the interior of the building structure 20.

Figure 2:
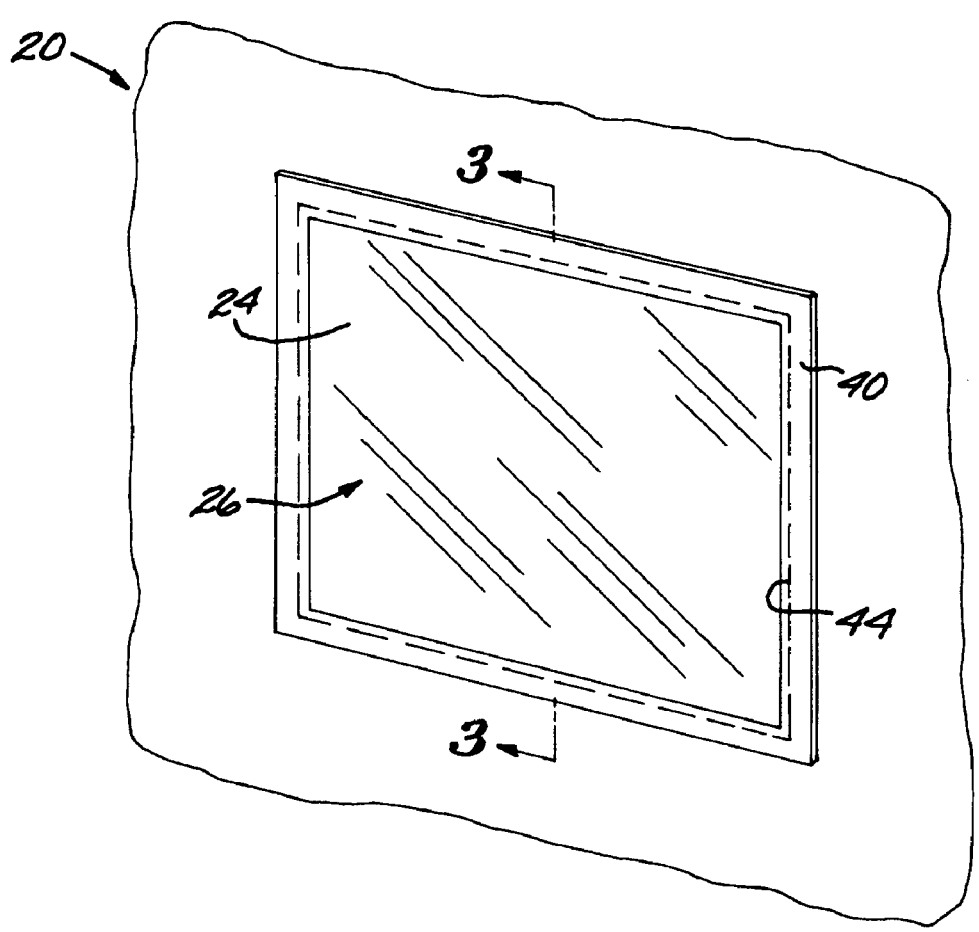
FIG. 2 is a perspective detail of FIG. 1, showing a building transparent window glazing in greater detail.

FIGS. 2-3 illustrate the structure of the windows 24 in greater detail. A window 24 in accordance with the present approach includes a building transparent window glazing 26. (As used herein, a "building transparent window glazing" is a sheet of glass made to be set into a frame to form a window of a building.) The building transparent window glazing 26 includes at least one, and in a typical case as illustrated, two panes 28, 30 of a material that is transparent to visible light. (As used herein, "visible light" is light of a wavelength of 425-675 nanometers, although the human eye normally has some sensitivity to light of wavelengths outside this range.) The material that is transparent to visible light is typically a glass such as a silica glass. The two-pane building glazing 26 has four surfaces 32, 34, 36, and 38 through which light passes. A single-pane building glazing 26 would have only two such surfaces. In a typical situation, the building transparent window glazing 26 has a surface area of at least 4 square feet, and more preferably has a surface area of at least 10 square feet.

As may be seen in FIG. 3, the two panes 28, 30 of glass are received in, set into, and affixed to a building window frame 40. The two panes 28, 30 of glass are generally parallel but spaced apart with a dead space 42 between them. The dead space 42 may be filled with air, an inert gas, or other gas, or may be evacuated. The dead space 42 reduces conductive and convective heat transfer through the building transparent window glazing 26. A single-glazed window has no such dead space.

The building window frame 40 is received in, set into, and affixed to an opening 44 through the building external wall 22. In this way, the building transparent window glazing 26 is securely affixed into the opening 44 through the building external wall 22.

An optical interference coating 46 overlies and contacts a first surface 48 of the building transparent window glazing 26, as shown in FIG. 4. The optical interference coating 46 is preferably a multilayer dielectric inorganic optical interference coating 46 made of dielectric materials, although organic optical interference coatings and metallic optical interference coatings, or other types, may be used. The first surface 48 could be any of the surfaces 32, 34, 36, or 38, and is here illustrated as the surface 36. Most preferably, the first surface 48 is one of the surfaces 34, 36 that faces the dead space 42, rather than the surface 32 that faces the interior of the building or the surface 38 that faces exteriorly. Once the building transparent window glazing 26 is fabricated and assembled, any coating on the surfaces 34, 36 that face the dead space 42 cannot be damaged by external forces, as by flying objects, window washers, and the like, unless the panes are broken or cracked.

The optical interference coating 46 typically has 20-100 individual layers 50, but may have more or fewer layers. The preferred multilayer dielectric inorganic optical interference coating 46 is made of inorganic materials that are typically sequentially deposited onto the first surface 48 by any operable deposition technique, with examples being physical vapor deposition, sputtering, and chemical vapor deposition. The multilayer dielectric inorganic optical interference coating 46 functions by reflection and interference of the various wavelengths of visible light that are incident upon the multilayer dielectric inorganic optical interference coating 46. Interference coatings are generally known in the art for other applications such as Fabry-Perot filters and etalons, and for other wavelengths, see for example U.S. Pat. Nos. 4,666,250 and 4,756,602, whose disclosures are incorporated by reference. The multilayer dielectric inorganic optical interference coating 46 functions to reflect light of particular visible wavelengths that is incident at particular angles.

The optical interference coating 46, and its preferred form the multilayer dielectric inorganic optical interference coating 46, is custom designed for each application. Computer programs used to design such coatings 46 for other applications, and which may be used in conjunction with the present approach, are commercially available, and for example include the Filmstar®, FilmWizard, Optilayer™, and TF Calc programs. The principles and design techniques are discussed in various references, including, for example, James D. Rancourt, "Optical Thin Films User Handbook, SPIE Optical Engineering Press, 1996, whose disclosure is incorporated by reference.

According to the present approach, a spectrally averaged transmission of visible light through the building transparent window glazing 26 with the optical interference coating 46 thereon is smaller at a higher angle of incidence than at a lower angle of incidence. The angle of incidence $A_i$ is the angle at which visible light is incident upon the building transparent window glazing 26 relative to the panes 28, 30, measured from the normal (perpendicular) incidence. That is, the angle of incidence of a light ray 52 that is perpendicular to the plane of the panes 28, 30 has a 0-degree angle of incidence $A_i$, and a light ray 54 that is incident upon the building transparent window glazing 26 at any other angle of incidence $A_i$ has a positive angle of incidence $A_i$. Two convenient reference angles of incidence are $A_i$=0-degrees and $A_i$=60-degrees.

As will be discussed subsequently in relation to some examples, the multilayer dielectric inorganic optical interference coating 46 does not transmit light equally for all wavelengths that are incident at a particular angle of incidence $A_i$. The amount of visible light transmitted at a particular angle therefore may be considered in terms of the transmitted visible light energy averaged over all visible wavelengths at a particular angle of incidence. It may be said that, for the present approach, the spectrally averaged transmission of visible light through the building transparent window glazing 26 with the optical interference coating 46 thereon is smaller at the angle of incidence $A_i$ of 60 degrees than at the angle of incidence $A_i$ of 0 degrees.

FIG. 5 illustrates some idealized curves of the visible-light spectrally averaged transmission of light in percent as a function of the angle of incidence $A_i$. A first relation 56 has nearly full transmission perpendicular to the panes 28, 30 ($A_i$ of 0-degrees), and the transmission falls rapidly so that very little light is transmitted at angles of incidence of 45 degrees and 60 degrees. The multilayer dielectric inorganic optical interference coating 46 designed according to relation 56 transmits almost no heat energy carried on the incident visible light at an angle of incidence of 45 degrees or 60 degrees, but also does not allow the occupant of the building to see anything through the window at these angles. At the other extreme, the optical interference coating 46 designed according to a second relation 58 transmits a relatively large amount of heat energy carried on the visible light incident at 45 degrees and 60 degrees, and also allows the building occupant to see features at these angles reasonably clearly. In an intermediate case, the optical interference coating 46 designed according to a third relation 60 transmits an intermediate amount of heat energy carried on the visible light incident at 45 degrees and 60 degrees, and also allows the building occupant to see features at these angles somewhat darkly, as though it were twilight. The transmission of visible light at an angle of incidence of 60 degrees may, for example, be selected to be less than 35 percent, or even less than 25 percent, of the intensity of the visible light at that angle of incidence.

The present approach also allows the optical interference coating 46 to be intentionally spatially varied in several ways. (Spatial non-uniform variation of the optical interference coating includes, but is not limited to, an absence of the optical interference coating in some areas and its presence in other areas, and gradations in the character of the optical interference coating.) FIGS. 6 and 7 illustrate two such spatial variations by way of example and not limitation. In FIG. 6, the optical interference coating 46 is applied to the topmost portion 80 and along the sides 82, 84 of the building transparent window glazing 26, but not in the central portion 86. The strips 82, 84 of optical interference coating 46 applied to the two sides are of different widths in the illustration. This spatial variation allows the occupant to have completely clear viewing through the central portion 86, at the cost of visible-light heating of the interior of the building, while reducing the transmission of visible light and its heat into the interior in the portions 80, 82, and 84, at the cost of somewhat reduced visibility in those areas. In FIG. 7, the optical interference coating 46 is graded so that it is less transparent in an upper portion 88 and more transparent in a mid portion 90, and there is no optical interference coating 46 in a lower portion 92, of the building transparent window glazing 26. Grading may be accomplished, for example, by varying the compositions or the number of layers of the optical interference coating to achieve various degrees of transmission. Grading may be stepwise in nature or continuously varying. Many other spatial variations may be identified for particular window applications.

The present approach allows the architect of the building to select among these and other types of relationships of transmission as a function of angle of incidence and spatial variation of the optical interference coating 46. The latitude of the location of the building is a prime consideration, because that determines the angle of incidence of sunlight at various times of the day and of the year. The orientation of the building and the windows are another consideration. The architect may wish, for example, to use the multilayer dielectric inorganic optical interference coating 46 having one relationship for south-facing windows in the northern hemisphere and north-facing windows in the southern hemisphere (where the sunlight is most intense), and other relationships for north-facing, east-facing, and west-facing windows. The architect may wish to use different relationships for windows on different floors of the building, and may even tailor the type and spatial position of the optical interference coating 46 for the views from a particular window or for the particular tenant who looks out through the window. The present approach provides a great deal of design flexibility.

Figure 8:
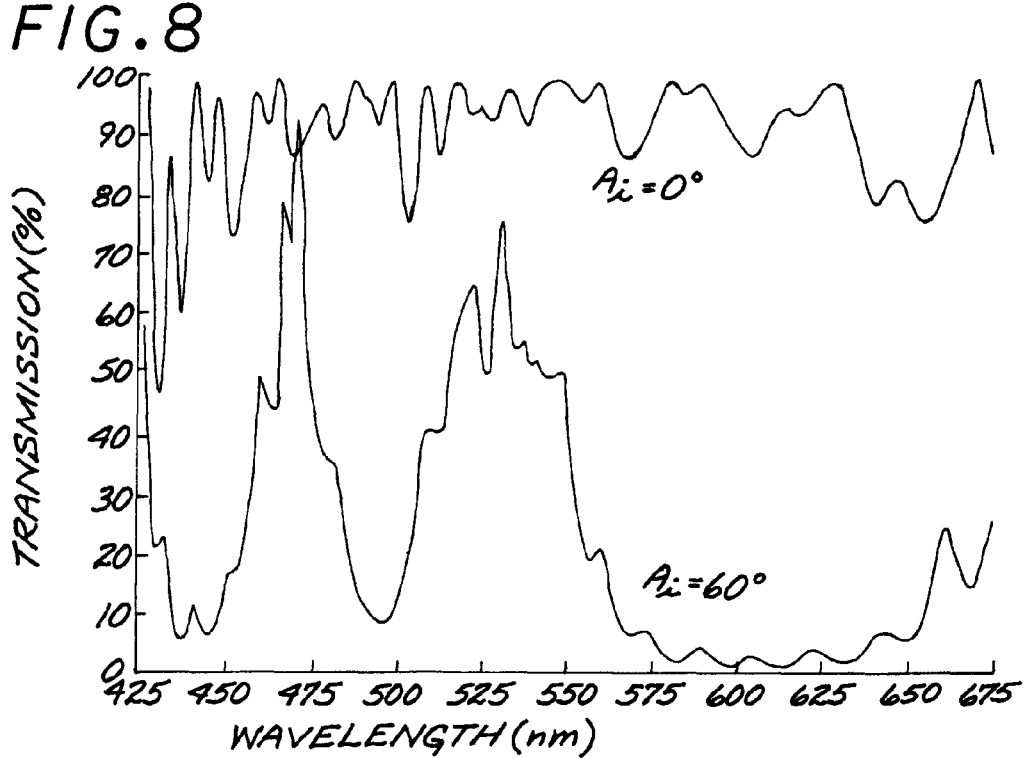
FIG. 8 is a calculated graph of a first example of light transmission as a function of wavelength for two angles of incidence.
Figure 9:
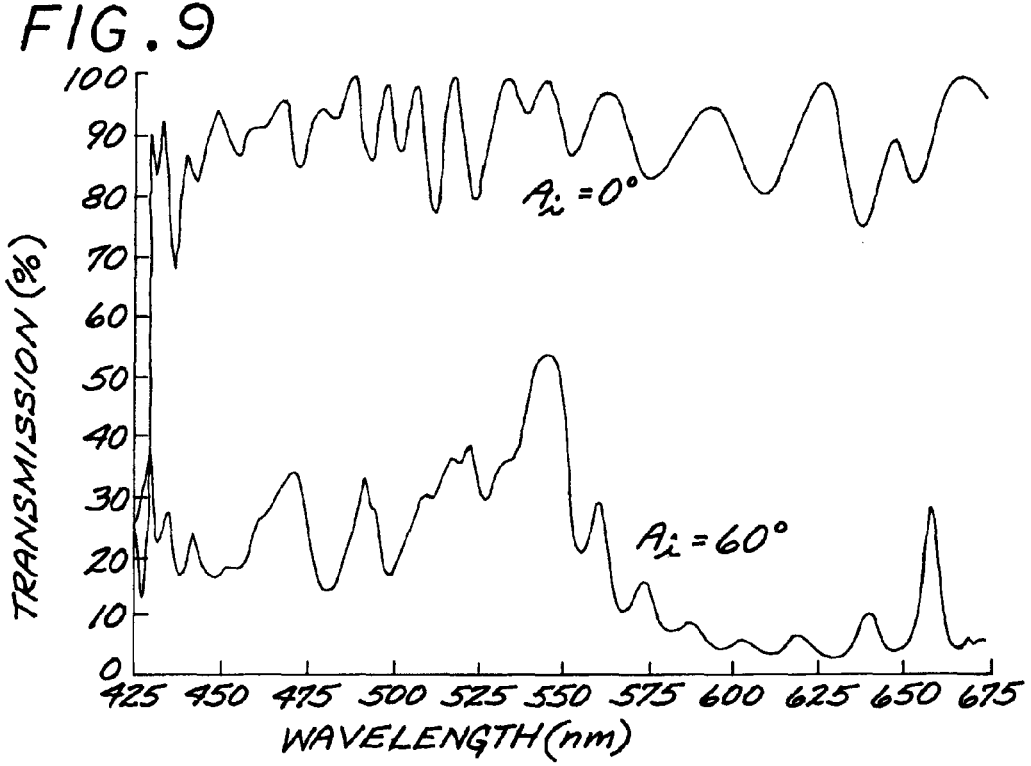
FIG. 9 is a calculated graph of a second example of light transmission as a function of wavelength for two angles of incidence.

Building transparent window glazing 26 utilizing the multilayer dielectric inorganic optical interference coating 46 have been designed and analyzed. FIGS. 8 and 9 present results for two of the designs by way of example. The multilayer dielectric inorganic optical interference coating 46 whose calculated results are depicted in FIG. 8 consists of a total of 61 alternating layers of $MgF_2$ and $TiO_2$. Each layer is of substantially constant thickness, the preferred approach for the multilayer dielectric inorganic optical interference coatings 46 generally. In this design, the thicknesses of the layers have not been allowed to vary independently, but rather have been forced into three groups of identical pairs, plus one independent layer. At an angle of incidence $A_i$ of 0 degrees (light ray perpendicular to the panes 28, 30), the spectrally averaged transmission of visible light through the building transparent window glazing 26 with the multilayer dielectric inorganic optical interference coating 46 thereon is about 90 percent, and at an angle of incidence $A_i$ of 60 degrees the spectrally averaged transmission of visible light is much less. As discussed earlier, the light transmission varies greatly as a function of wavelength, and therefore the spectrally averaged transmission of visible light is used to present the average value over the visible-light spectrum.

The multilayer dielectric inorganic optical interference coating 46 whose calculated results are presented in FIG. 9 is similar, but the layer thicknesses have been allowed to vary independently. The spectrally averaged transmission is still about 90 percent at an angle of incidence $A_i$ of 0 degrees, but is even lower than in the example of FIG. 8, and in this case less than 25 percent, for the angle of incidence $A_i$ of 60 degrees. Allowing the layer thicknesses to vary independently therefore allows a reduction in the transmission of the visible light through the building transparent window glazing 26, but also increases the complexity and cost of performing the deposition of the multiple layers.

As noted earlier, the present approach may be used by itself, or more preferably in conjunction with other techniques for reducing the transmission of infrared and other energy through the building transparent window glazing 26 and into the interior of the building structure 20. For example and as illustrated in FIG. 3, an infrared-reduction coating 70 may overlie and contact a second surface 72 of the building transparent window glazing 26. It is preferred that the optical interference coating 46 and the infrared-reduction coating 70 not be deposited on top of each other, as the presence of one may have an adverse effect on the performance of the other. However, if there is no such adverse effect, they may be deposited one on top of the other or, alternatively stated, the first surface 48 and the second surface 72 could be the same surface of the window panes 28, 30. More preferably, the first surface 48 and the second surface 72 are different ones of the surfaces 32, 34, 36, and 38. Preferably, the first surface 48 is one of the surfaces 34, 36 facing the dead space 42, and the second surface 72 is the other of the surfaces 34, 36. In the present case, the first surface 48 is shown as the surface 34, and the second surface 72 is shown as the surface 36, in FIG. 3

The infrared-reduction coating may be of any operable type. It may be a substantially non-directional infrared-attenuation coating such as indium-tin-oxide (ITO) or a tint, or an angle-dependent coating like the optical interference coating 46, except designed for infrared-light reflection rather than visible-light reflection. The non-directional infrared-attenuation coatings are preferred in this case, as there is no concern with having good infrared transmission at angles of incidence near 0 degrees, and the non-directional infrared-attenuation coatings are less expensive to apply than the multilayer coatings.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A building structure comprising:
   a building transparent window glazing; and
   an optical interference coating overlying and contacting a first surface of the building transparent window glazing, wherein a spectrally averaged transmission of visible light through the building transparent window glazing with the optical interference coating thereon is substantially smaller at a higher angle of incidence than at a lower angle of incidence;
   wherein the spectrally averaged transmission of visible incident light through the building transparent window glazing with the optical interference coating thereon at an angle of incidence of 60 degrees is less than 35 percent of an intensity of the visible incident light; and
   wherein the spectrally averaged transmission of visible incident light through the building transparent window glazing with the optical interference coating thereon at an angle of incidence of 0 degrees is about 90 percent of an intensity of the visible incident light.

2. The building structure of claim 1, wherein the optical interference coating is a multilayer dielectric inorganic optical interference coating.

3. The building structure of claim 1, wherein the building transparent window glazing is made of silica glass.

4. The building structure of claim 1, further including a building window frame in which the building transparent window glazing is received.

5. The building structure of claim 1, wherein the building transparent window glazing comprises
   two panes of glass set into a building window frame with a dead space between the panes of glass, and wherein the first surface is on one of the two panes of glass.

6. The building structure of claim 1, further including
   a wall of a building, and
   an opening through the wall of the building in which the building transparent window glazing is received.

7. The building structure of claim 1, further including
   a south-facing wall of a building, and
   a building window frame in which the building transparent window glazing is received;
   an opening through the wall of the building in which the building window frame is received.

8. The building structure of claim 1, wherein
   the first surface of the building transparent window glazing has a surface area of at least 4 square feet.

9. The building structure of claim 1, wherein
   the first surface of the building transparent window glazing has a surface area of at least 10 square feet.

10. The building structure of claim 1, further including
    an infrared-reduction coating overlying and contacting a second surface of the building transparent window glazing.

11. The building structure of claim 1, wherein the optical interference coating is spatially non-uniform.

12. A building structure comprising:
    a building transparent window glazing; and
    an optical interference coating overlying and contacting a first surface of the building transparent window glazing, wherein a spectrally averaged transmission of visible light through the building transparent window glazing with the optical interference coating thereon is substantially smaller at a higher angle of incidence than at a lower angle of incidence;
    wherein the spectrally averaged transmission of visible incident light through the building transparent window glazing with the optical interference coating thereon at an angle of incidence of 60 degrees is less than 25 percent of an intensity of the visible incident light; and
    wherein the spectrally averaged transmission of visible incident light through the building transparent window glazing with the optical interference coating thereon at an angle of incidence of 0 degrees is about 90 percent of an intensity of the visible incident light.

13. A building structure comprising:
    a building transparent window glazing; and
    an optical interference coating overlying and contacting a first surface of the building transparent window glazing, wherein a spectrally averaged transmission of visible light through the building transparent window glazing with the optical interference coating thereon is substantially smaller at an angle of incidence of 60 degrees than at an angle of incidence of 0 degrees;
    wherein the spectrally averaged transmission of visible incident light through the building transparent window glazing with the optical interference coating thereon at an angle of incidence of 60 degrees is less than 35 percent of an intensity of the visible incident light; and
    wherein the spectrally averaged transmission of visible incident light through the building transparent window glazing with the optical interference coating thereon at an angle of incidence of 0 degrees is about 90 percent of an intensity of the visible incident light.

14. The building structure of claim 13, wherein the optical interference coating is a multilayer dielectric inorganic optical interference coating.

15. The building structure of claim 13, wherein the building transparent window glazing comprises
    two panes of glass set into a building window frame with a dead space between the panes of glass, and wherein the first surface is on one of the two panes of glass.

16. The building structure of claim 13, further including
    an infrared-reduction coating overlying and contacting a second surface of the building transparent window glazing.

17. The building structure of claim 13, further including
    a building window frame in which the building transparent window glazing is received.

18. The building structure of claim 13, wherein the optical interference coating is spatially non-uniform.

19. A building structure comprising:
    a building transparent window glazing; and
    an optical interference coating overlying and contacting a first surface of the building transparent window glazing, wherein a spectrally averaged transmission of visible light through the building transparent window glazing with the optical interference coating thereon is smaller at a higher angle of incidence than at a lower angle of incidence;
    wherein the spectrally averaged transmission of visible incident light through the building transparent window glazing with the optical interference coating thereon at an angle of incidence of 60 degrees is less than 35 percent of an intensity of the visible incident light; and
    wherein the spectrally averaged transmission of visible incident light through the building transparent window glazing with the optical interference coating thereon at an angle of incidence of 0 degrees is about 90 percent of an intensity of the visible incident light.

20. The building structure of claim 19, wherein the optical interference coating is a multilayer dielectric inorganic optical interference coating.

21. The building structure of claim 19, wherein the building transparent window glazing is made of silica glass.

22. The building structure of claim 19, further including
    a building window frame in which the building transparent window glazing is received.

23. The building structure of claim 19, wherein the building transparent window glazing comprises
    two panes of glass set into a building window frame with a dead space between the panes of glass, and wherein the first surface is on one of the two panes of glass.

24. The building structure of claim 19, further including
    a wall of a building, and
    an opening through the wall of the building in which the building transparent window glazing is received.

25. The building structure of claim 19, further including
    a south-facing wall of a building, and
    a building window frame in which the building transparent window glazing is received;
    an opening through the wall of the building in which the building window frame is received.

26. The building structure of claim 19, wherein
    the first surface of the building transparent window glazing has a surface area of at least 4 square feet.

27. The building structure of claim 19, wherein
    the first surface of the building transparent window glazing has a surface area of at least 10 square feet.

28. The building structure of claim 19, further including an infrared-reduction coating overlying and contacting a second surface of the building transparent window glazing.

29. A building structure comprising:
a building transparent window glazing; and
an optical interference coating overlying and contacting a first surface of the building transparent window glazing, wherein a spectrally averaged transmission of visible light through the building transparent window glazing with the optical interference coating thereon is smaller at an angle of incidence of 60 degrees than at an angle of incidence of 0 degrees;
wherein the spectrally averaged transmission of visible incident light through the building transparent window glazing with the optical interference coating thereon at an angle of incidence of 60 degrees is less than 35 percent of an intensity of the visible incident light; and
wherein the spectrally averaged transmission of visible incident light through the building transparent window glazing with the optical interference coating thereon at an angle of incidence of 0 degrees is about 90 percent of an intensity of the visible incident light.

* * * * *